United States Patent
Tang et al.

(10) Patent No.: US 7,414,380 B2
(45) Date of Patent: Aug. 19, 2008

(54) APPARATUS FOR INDUCTIVELY RECHARGING BATTERIES OF A PORTABLE CONVENIENCE DEVICE

(75) Inventors: Qingfeng Tang, Novi, MI (US); Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 359 days.

(21) Appl. No.: 10/946,137

(22) Filed: Sep. 21, 2004

(65) Prior Publication Data

US 2006/0061325 A1    Mar. 23, 2006

(51) Int. Cl.
    *H01M 10/46*  (2006.01)
(52) U.S. Cl. .................................................. 320/108
(58) Field of Classification Search ................ 320/107, 320/108, 114, 115
    See application file for complete search history.

(56) References Cited

U.S. PATENT DOCUMENTS

| 4,611,161 | A | 9/1986 | Barker |
| 5,889,384 | A | 3/1999 | Hayes et al. |
| 5,949,214 | A | 9/1999 | Broussard et al. |
| 5,959,433 | A | 9/1999 | Rohde |
| 6,100,663 | A | 8/2000 | Boys et al. |
| 6,127,799 | A | 10/2000 | Krishman |
| 6,184,651 | B1 | 2/2001 | Fernandez et al. |
| 6,208,115 | B1 | 3/2001 | Binder |
| 6,563,474 | B2 | 5/2003 | Nantz et al. |
| 6,661,197 | B2 | 12/2003 | Zink et al. |
| 2003/0025478 | A1 | 2/2003 | Zink et al. |
| 2003/0048095 | A1 | 3/2003 | Zink et al. |
| 2003/0231001 | A1 | 12/2003 | Bruning |
| 2004/0066169 | A1 | 4/2004 | Bruning |

FOREIGN PATENT DOCUMENTS

| WO | WO 96/37052 | 11/1996 |
| WO | WO 2004/073283 | 8/2004 |

*Primary Examiner*—Edward Tso
(74) *Attorney, Agent, or Firm*—MacMillan, Sobanki & Todd, LLC

(57) ABSTRACT

A rechargeable apparatus is provided for being recharged by an power source. The rechargeable apparatus include a rechargeable battery and a secondary inductive coil excited by the power source. The secondary inductive coil includes a first inductor having a first axis, a second inductor having a second axis, and a third inductor having a third axis. The first, second, and third axes are mutually orthogonal. The first, second, and third inductors produce a power output in response to said power source. The secondary inductive coil is electrically connected to the rechargeable battery whereby charging energy is coupled from the power source to the rechargeable battery regardless of an orientation of the secondary inductive coil to the power source.

4 Claims, 4 Drawing Sheets

APPARATUS FOR INDUCTIVELY RECHARGING BATTERIES OF A PORTABLE CONVENIENCE DEVICE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

It is well known that contactless charging systems use inductive charging to recharge portable devices without the need for electrically connecting one or more contact terminals for transferring electrical energy to the portable device. Examples of such portable devices include cordless telephones, electronic toothbrushes, and other electronic convenience devices. Such devices typically include a base charging unit and a portable device. The base charging unit includes a primary inductive coil electrically connected to a power source. The power source provides an alternating current (AC) voltage supply (or a direct current voltage supply rectified to produce an AC voltage supply) for energizing the primary inductive coil. The primary inductive coil generates an electromagnetic field for inducing an electrical charge on a secondary inductive coil within in the portable device. The secondary inductive coil may be located within a rechargeable battery housing or elsewhere in the portable device. The energy induced in the secondary inductive coil is then converted to a DC voltage supply for charging the rechargeable battery.

As is readily apparent to those skilled in the art, the transfer of inductive energy from the primary inductive coil to the secondary inductive coil is optimized when the primary and secondary inductive cells are aligned about a single axis of an electromagnetic field having various vectors of transmission/reception. As a result, efficiency of energy transfer for recharging of the remote device is dependent upon the orientation of the portable device to the base unit (i.e., the orientation of the vector components of the transmitting electromagnetic field of the primary inductive coil to the orientation of the vector components of the receiving electromagnetic field secondary inductive coil). To properly position the portable device for optimum charging the rechargeable battery, a docking port or cradle is provided that orients the remote device to the base charging unit. This aligns both the primary and the secondary inductive coils along respective axes so that the vector components of each inductive coil are aligned for transmission and reception. However, this requires that the remote device be fully seated in the same location of the charging port every time charging of the rechargeable battery is required. Any misalignment or improper docking of the remote device in the charging port may result in inadequate charging of the re-chargeable battery.

Other methods known for aligning the electromagnetic fields of the primary and secondary inductive coils include automatically rotating the primary inductive coil about an axis to align the vector components of transmitting primary inductive coil with the vector components of the secondary inductive coil. Such devices include a primary inductive coil that is rotatable about an axis via a motorized mechanism. A controller controls the rotation of the primary inductive coil as it is rotated about the axis. A shaft encoder/decoder is utilized to monitor the degree of rotation and provide signals to the controller. As the primary inductive coil is rotated about the axis, the secondary inductive coil of the rechargeable battery absorbs electrical energy induced by the primary inductive coil. The energy absorbed by the secondary inductive coil is measured by the controller. The controller determines the final position of the primary inductive coil based on the current measurement. As the vector components of the primary inductive coil and secondary inductive coil becomes increasingly aligned, the current measurement increases. Based on the peak transmission of electrical energy between the primary and secondary inductive coils at a respective degree of rotation, the controller will re-align the position of the primary inductive coil for optimum recharging performance. Although this automated process eliminates the operation of manually orienting the remote device to the base unit for optimum charging, additional cost and packaging space are required for the additional devices required to execute this automated process. Such additional devices include the controller, the mechanical mechanism for rotating the coil, current drivers, and the shaft encoder/decoder for monitoring rotational position of the coil.

In addition, because cellular telephones are shaped and sized dimensional different along with different battery orientations, docking ports are sized differently, particularly in a vehicle, for cradling a respective cellular telephone. What would be useful would be to have a charging apparatus that can accommodate various sized and shaped cellular telephones including the different battery orientations.

SUMMARY OF THE INVENTION

The present invention has the advantage of utilizing a three dimensional inductive coil for charging a rechargeable battery of a remote device utilizing inductive charging, whereby the three dimensional inductive coil allows the remote device to be inductively charged by a power source regardless of the orientation of the remote device to the power source.

In one aspect of the present invention, a rechargeable apparatus is provided for being recharged by a power source. The rechargeable apparatus includes a rechargeable battery and a secondary inductive coil excited by the power source. The secondary inductive coil includes a first inductor having a first axis, a second inductor having a second axis, and a third inductor having a third axis. The first, second, and third axes are mutually orthogonal to one another. The first, second, and third inductors produce a power output in response to said power source. The secondary inductive coil is electrically connected to the rechargeable battery whereby charging energy is coupled from the power source to the rechargeable battery regardless of an orientation of the secondary inductive coil to the power source.

DETAILED DESCRIPTION OF PREFERRED EMBODIMENTS

Figure 1:
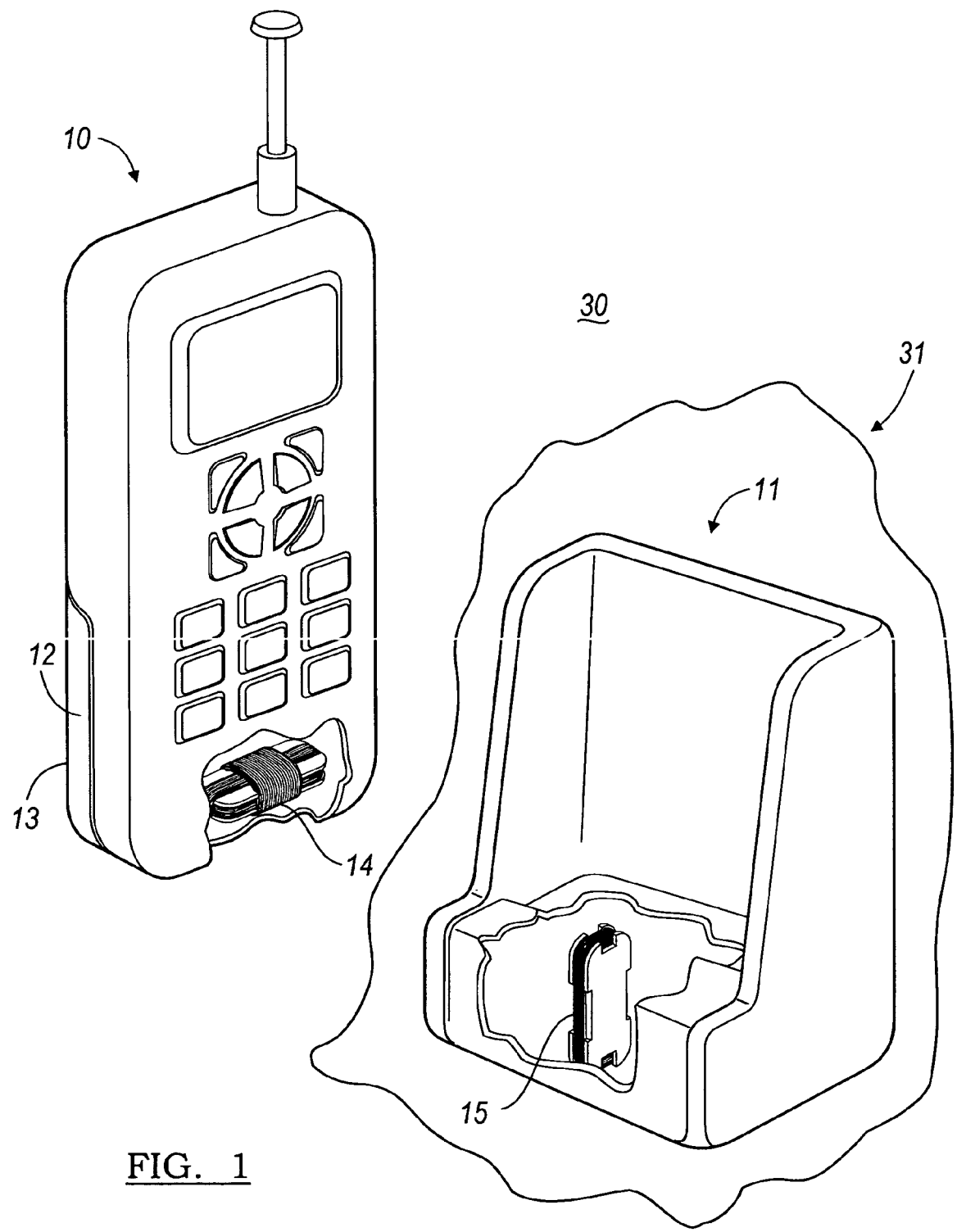
FIG. 1 is a perspective view of a cellular telephone and a base charging unit according to a first preferred embodiment of the present invention.

Referring now to the Drawings and particularly to FIG. 1, there is shown a perspective view of a cellular telephone 10 and a vehicular base charging unit 111 according to the present invention. The base charging unit 11 is disposed in an interior compartment 31 of a vehicle 30. The cellular telephone 10 is a portable communication device used for transmitting and receiving wireless communication signals. When the cellular telephone 10 is remotely detached from the base charging unit 11, the cellular telephone is powered by a detachable power source such as a rechargeable battery 12. The rechargeable battery 12 is encased in a housing 13 for concealment and protection from exterior elements. The rechargeable battery 12 is re-chargeable while attached to the cellular telephone 10 and may be recharged while detached from the cellular telephone 10 when control circuitry required for recharging is integrated within the housing 13.

Figure 2:
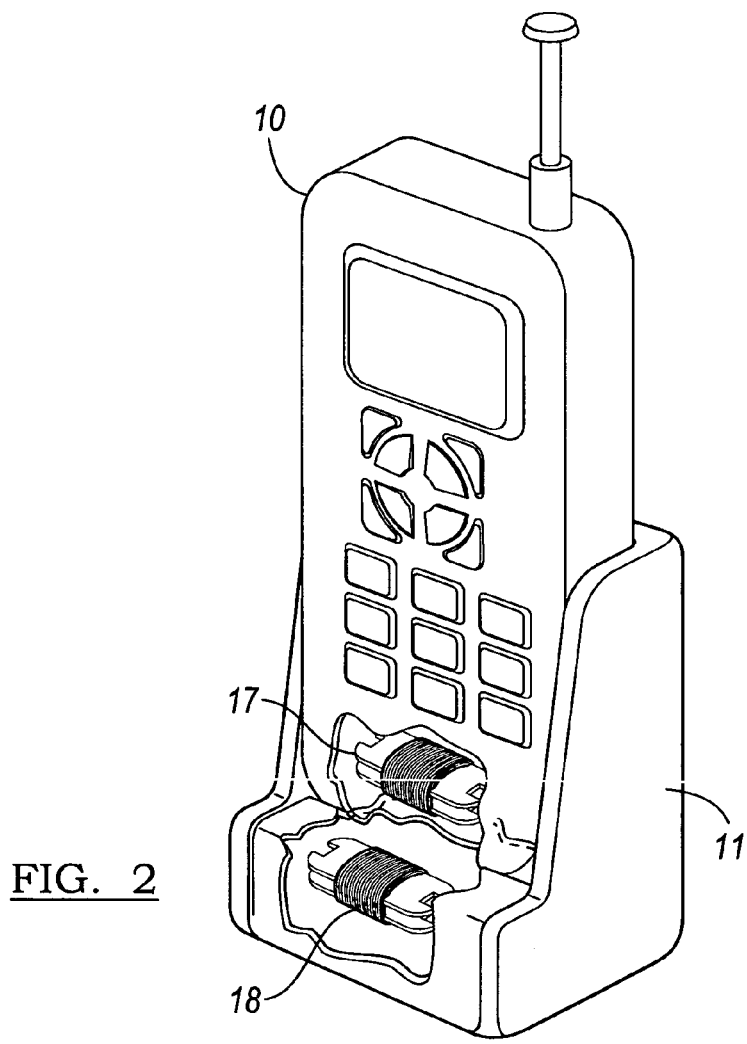
FIG. 2 is a perspective view of an energy conversion unit for recharging a rechargeable battery.

Contactless charging is known for recharging a cellular telephone battery. This method typically includes utilizing a single inductor in the base charging unit that have vector components that are directionally aligned with the vector components of a single inductor disposed in the cellular telephone 10. A docking port of a base charging unit cradles the cellular telephone 10 to position each inductor so that the electromagnetic energy transmission is optimum for charging. For visual enhancement, all inductive coils shown in each of the Figures are enlarged for clarity purposes. FIG. 2 illustrates this concept of the base charging unit 11 having a single inductor 18 disposed within a bottom portion of the cellular telephone 10. The base charging unit 11 applies an induced electromagnetic field via inductor 18 to induce charging energy within a single inductor 17 of the cellular telephone 10. The base charging unit 11 is used as a docking port to cradle the cellular telephone 10 at a position that is optimal for inducing electromagnetic energy transmittable between the inductor 18 of the base charging unit 11 and the inductor 17 of the cellular telephone 10. When properly positioned within the cradle of the docking port, the field of energy transmission of inductor 18 and the field of energy absorption of inductor 17 are positioned to induce a voltage in inductor 17. Charging energy excited within inductor 17 is rectified for charging the rechargeable battery 12. Aside from the strength of the electromagnetic field, the alignment of inductor 18 to inductor 17 will be a determining factor for the amount of charge that is transmitted to the rechargeable battery 12. Any misalignment or improper positioning between the cellular telephone 10 and the charging port 11 may result in a misalignment of the transmitting and receiving electromagnetic fields of the inductors which may result in a reduction of energy induced within inductor 17. To compensate for any misalignment, the field strength may be increased, however this creates more electromagnetic interference to other electrical devices and creates energy waste.

FIG. 1 illustrates the preferred embodiment for recharging the rechargeable battery 10. A first inductive coil such as a primary inductive coil 15 is disposed in the base charging unit 11 which is energized by a power source (shown in FIG. 5). The energized primary inductive coil 15 transmits an electromagnetic field with a respective orientation dependent on the orientation of the primary inductive coil 15. A remote device such as the cellular telephone 10 includes a second inductive coil such as a secondary inductive coil 14 that is induced by the field of electromagnetic energy from the primary inductive coil 15.

In the preferred embodiment, the secondary inductive coil 14 is a three dimensional inductive coil which has inductors oriented in multiple directions such as the X, Y, and Z axes. A first inductor includes windings wound about a first axis (i.e., X-axis), a second inductor includes windings wound about a second axis (i.e., Y-axis), and a third inductor includes windings wound about a third axis (i.e., Z-axis) which are non-parallel to one another. The first, second, and third inductors are wound on a common core center. The orientation of the first, second, and third inductors about the X, Y, and Z axes, respectively, allows for the electromagnetic field to be received in more that just one orientation. As a result, the cellular telephone 10 having the secondary inductive coil 14 positionally fixed within the housing 13 may be oriented in multiple positions in relation to the base charging unit 11. Either of the first, second, and third inductors may produce a power output individually or a combined power output may be produced by at least two inductors. Furthermore, the first, second, and third inductors may be interconnected to one another at or near the common core center or the power output from each inductor may be combined by a control circuit. When the first, second, and third inductors are electrically interconnected to one another for producing a combined power output, the secondary inductive coil 14 optimizes the reception of electromagnetic fields when the axis of the primary inductive coil 15 and the secondary inductive coil 14 are not properly positioned. For example, if the axis of the primary inductive coil 15 is positioned at a 45 degree angle between the X and Y axes of the secondary inductive coil 14, then both the first and second inductors of the secondary inductive coil 14 will absorb a portion of the generated electromagnetic field and will cooperatively produce the combined power output for recharging the rechargeable battery 12. Other combined axes include the X and Z axes, the Y and Z axes, and the X and Y and Z axes. As a result, the cellular telephone may be positioned upright, face down, face up, sideways or diagonal in close proximity to the primary inductive coil 15 of the base charging unit 11 for charging the rechargeable battery 12.

Figure 3:
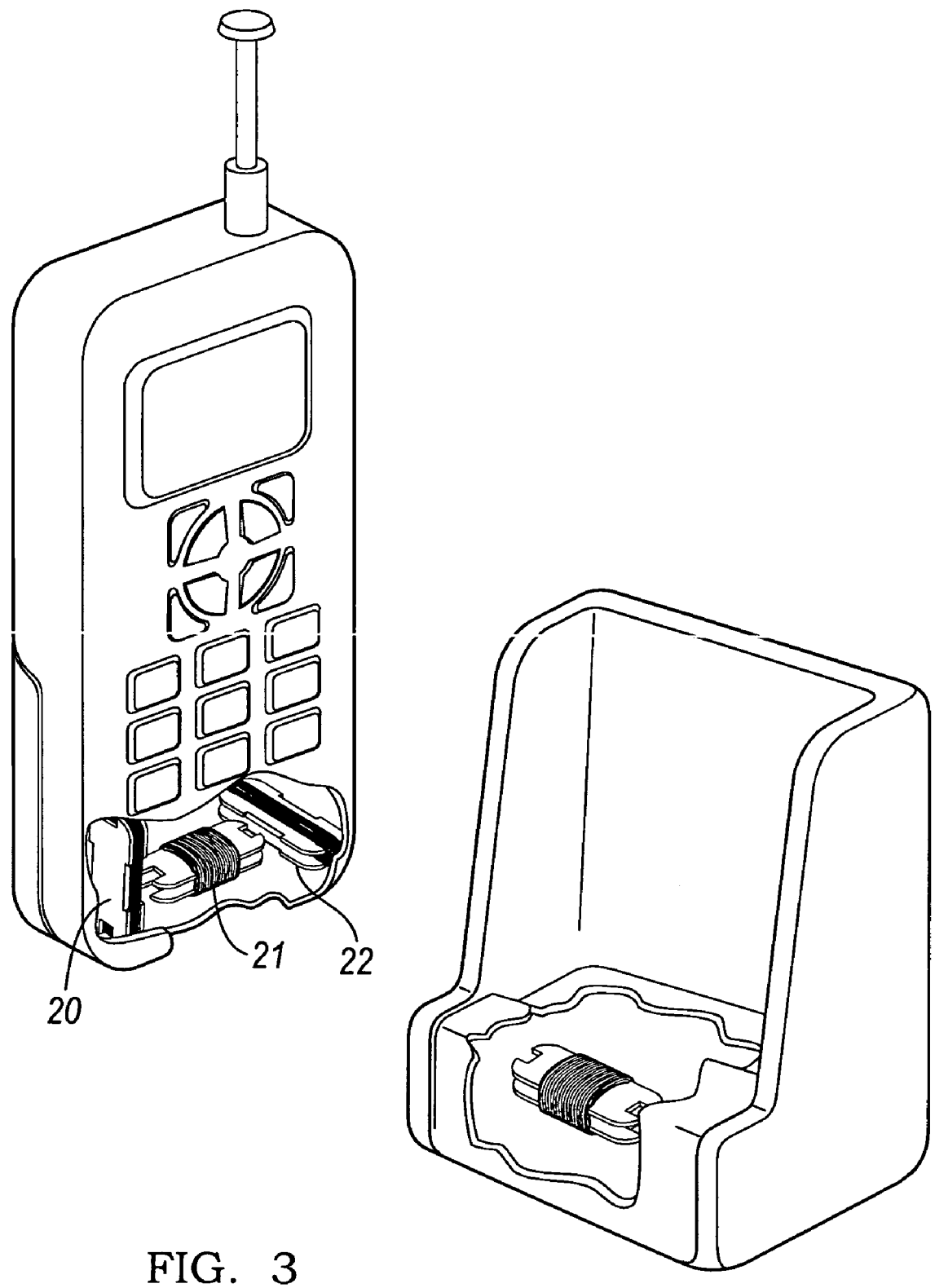
FIG. 3 is a perspective view of a cellular telephone and a base charging unit according to a second preferred embodiment of the present invention.

FIG. 3 illustrates another preferred embodiment for charging a rechargeable battery. In this preferred embodiment, the rechargeable battery 12 includes three individual inductive coils each wound around a separate core preferably in close proximity to one another. Although each inductive coil is wound about a respective core for forming a first inductor 20, a second inductor 21, and a third inductor 22, the set of inductors may be interconnected to one another for forming the second inductive coil which provides a combined power output for supplying charging energy to the rechargeable battery 12. Alternatively, the power output from each inductor may be combined in another circuit such as the control circuit for rectifying the power output.

Figure 4:
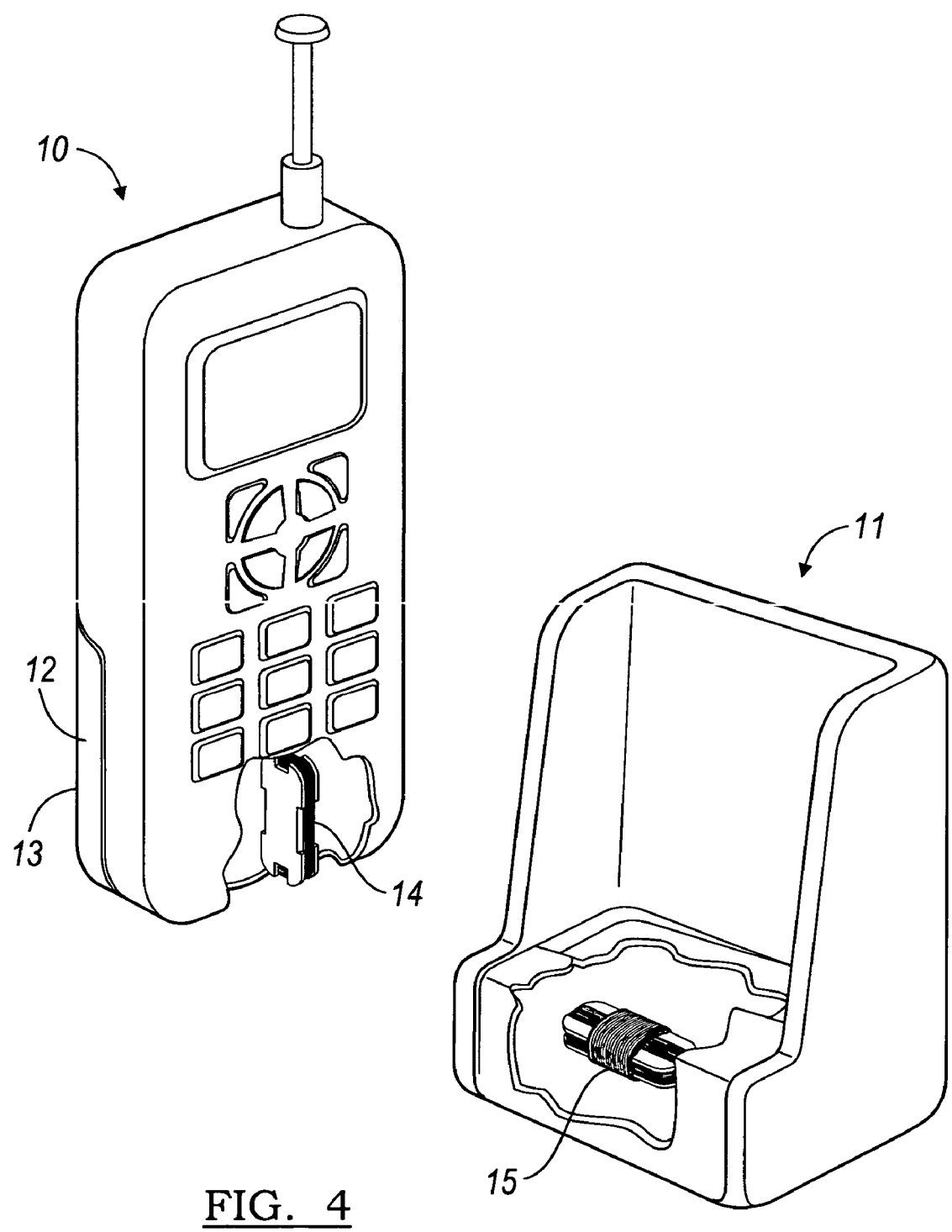
FIG. 4 is a perspective view of a cellular telephone and a base charging unit according to a third preferred embodiment of the present invention.

FIG. 4 illustrates yet another preferred embodiment for charging a rechargeable battery. The primary inductive coil 15 utilized for generating an electromagnetic field for inducing the secondary inductive coil 14 includes a three dimensional inductive coil. The primary inductive coil 15 generates electromagnetic fields that are orthogonal to one another. The secondary inductive coil 14 disposed within cellular telephone 10 includes a single inductor. The cellular phone 10 or rechargeable battery 12 (if the primary inductive coil is integrated within the rechargeable battery) may be oriented in multiple directions to the base charging unit 11. The primary inductive coil 15 transmits an electromagnetic field along multiple vector components. The secondary inductive coil 14 needs only to receive the transmitted energy in at least one of the multiple transmitting vector components for inducing the secondary inductive coil 14. In yet another preferred embodiment, the primary inductive coil 15 and the secondary inductive coil 14 both include a three dimensional inductive coil for transmitting an electromagnetic field about the multiple axial directions and for receiving the electromagnetic field about multiple axial directions.

Figure 5:
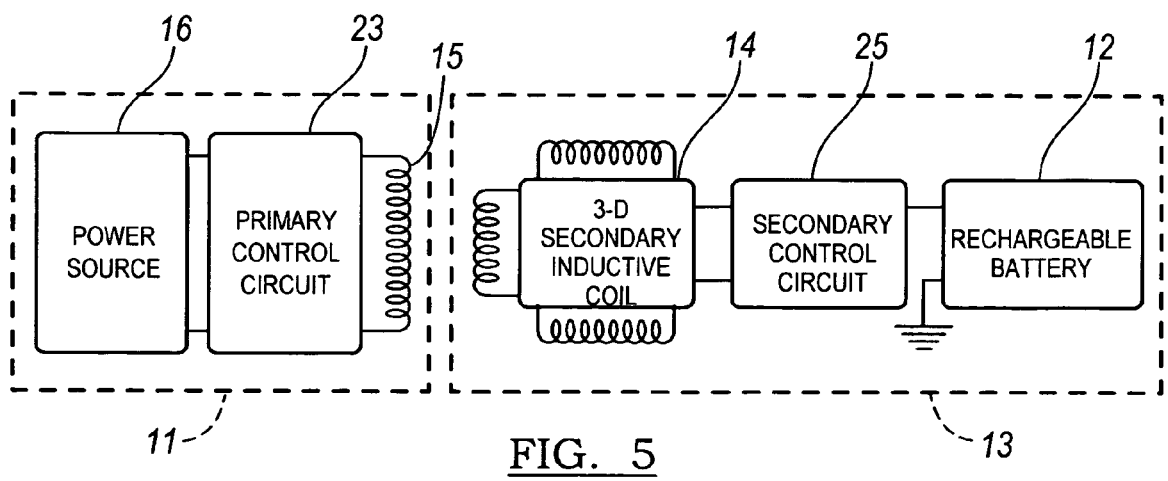
FIG. 5 illustrates block diagram of the recharging system according to a preferred embodiment of the present invention.

FIG. 5 illustrates a block diagram of the cellular telephone and base charging unit according to the preferred embodiment of the present invention. The base charging unit 11 is shown to include the power source 16. The power source 16 may be integrated in the base charging unit 11 and receive its energy input from an energy storage device such as a household electrical outlet or energy generating device within a vehicle such as a vehicle battery or an alternator. Alternatively, the power source 16 may be exterior to the base charging unit 11. The power source 16 includes circuitry for converting the input power to a desired AC energy output (i.e., if the energy storage device is a DC supply). A primary control circuit 23 is provided for regulating and controlling the energy energized on the primary inductive coil 15. The primary inductive coil 15 may be integrated as part of the power source 16 or may be separate but electrically connected to the power source 16. The primary control circuit 23 may also include a sensing circuit that the controls the state of charge generated on the primary inductive coil 15 which is thereafter induced on the secondary inductive coil 14. A preferred embodiment includes a measurement circuit for measuring the voltage and/or current to the rechargeable battery for determining the state of charge of the rechargeable battery 12. In yet another embodiment, a temperature sensor could be integrated for ascertaining the state of temperature for determining an overheating condition of the rechargeable battery 12. In yet another preferred embodiment, a fail safe circuit can be utilized for terminating the charging of the rechargeable battery 12 when an overload condition is detected or when unordinary amounts of energy are being conducted to the rechargeable battery.

The housing 13 is adaptable to the cellular telephone 12 which encases and protects the rechargeable battery 16 from exterior elements. The secondary inductive coil 14 includes the three dimensional inductive coil. The three dimensional coil comprises three inductive coils in which the inductors are oriented in multiple directions and are interconnected to provide combined power to a secondary control circuit 25. In a preferred embodiment, the three inductors may be wound about a common core. The common core may be made from any suitable material such as ferrite, aluminum, or air. In an alternative embodiment, three non-contacting cores are utilized whereby the coils are electrically connected to cooperatively supply power to the secondary control circuit 25. The secondary control circuit 25 includes circuitry for rectifying an induced AC output from the secondary inductive coil 14 for recharging the rechargeable battery 16. Alternatively, each power output of the three inductors may be individually supplied to the secondary control circuit 25 and the power output of each inductor may be combined in the secondary control circuit 25.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A battery powered electronic device comprising:
   an electronic device;
   a battery connected to the electronic device for supplying electrical power thereto; and
   a circuit connected to the battery for supplying electrical power thereto, the circuit including a first inductor, a second inductor, and a third inductor that are wound upon a common core that is shaped in the form of a rectilinear parallelepiped, the first, second, and third inductors defining respective first, second, and third axes that are mutually orthogonal relative to one another.

2. The battery powered electronic device defined in claim 1 wherein the common core defines first, second, and third dimensions, and wherein the first dimension defined by the common core is substantially smaller than the second and third dimensions.

3. The battery powered electronic device defined in claim 1 wherein the common core includes a peripheral surface defined by the first axis having a recess formed therein, and wherein the first inductor is disposed within the recess.

4. The battery powered electronic device defined in claim 1 wherein the electronic device is a cellular telephone.

* * * * *